Nov. 17, 1964 R. L. TWEEDALE 3,157,297
GRAIN TANK AND CONVEYOR MECHANISM FOR COMBINES
Filed Nov. 29, 1962 2 Sheets-Sheet 2

INVENTOR.
Ralph L. Tweedale
BY Wolfe, Hubbard, Voit & Osann
ATTORNEYS

United States Patent Office 3,157,297
Patented Nov. 17, 1964

3,157,297
GRAIN TANK AND CONVEYOR MECHANISM
FOR COMBINES
Ralph L. Tweedale, Southfield, Mich., assignor to Massey-Ferguson Inc., Detroit, Mich., a corporation of Maryland
Filed Nov. 29, 1962, Ser. No. 240,956
1 Claim. (Cl. 214—17)

This invention relates generally to crop harvesting machines such as self-propelled combines, and concerns, more particularly, an improved grain tank and conveyor mechanism for temporarily storing and handling harvested grain in such machines.

A self-propelled combine of the type with which the invention is concerned includes a pair of grain receiving tanks arranged to straddle the cleaning and separating unit of the combine. A crop conveyor at the bottom of the cleaning and separating unit collects the threshed grain and carries it to a grain elevator which lifts the grain to a filling conveyor which deposits the grain in the pair of tanks.

The invention lies in providing such a combine with a hood interconnecting the grain elevator and the filling conveyor and having a door in the hood selectively positionable to direct grain to one or the other of the side tanks. In addition, the invention contemplates providing a sloping transfer conveyor for moving grain from one side tank to the other and in arranging the transfer and discharge augers in such a manner that no openings are created through the cleaning and separating unit of the combine.

An example of the inventive grain tank and conveyor mechanism is shown in the accompanying drawings, in which.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
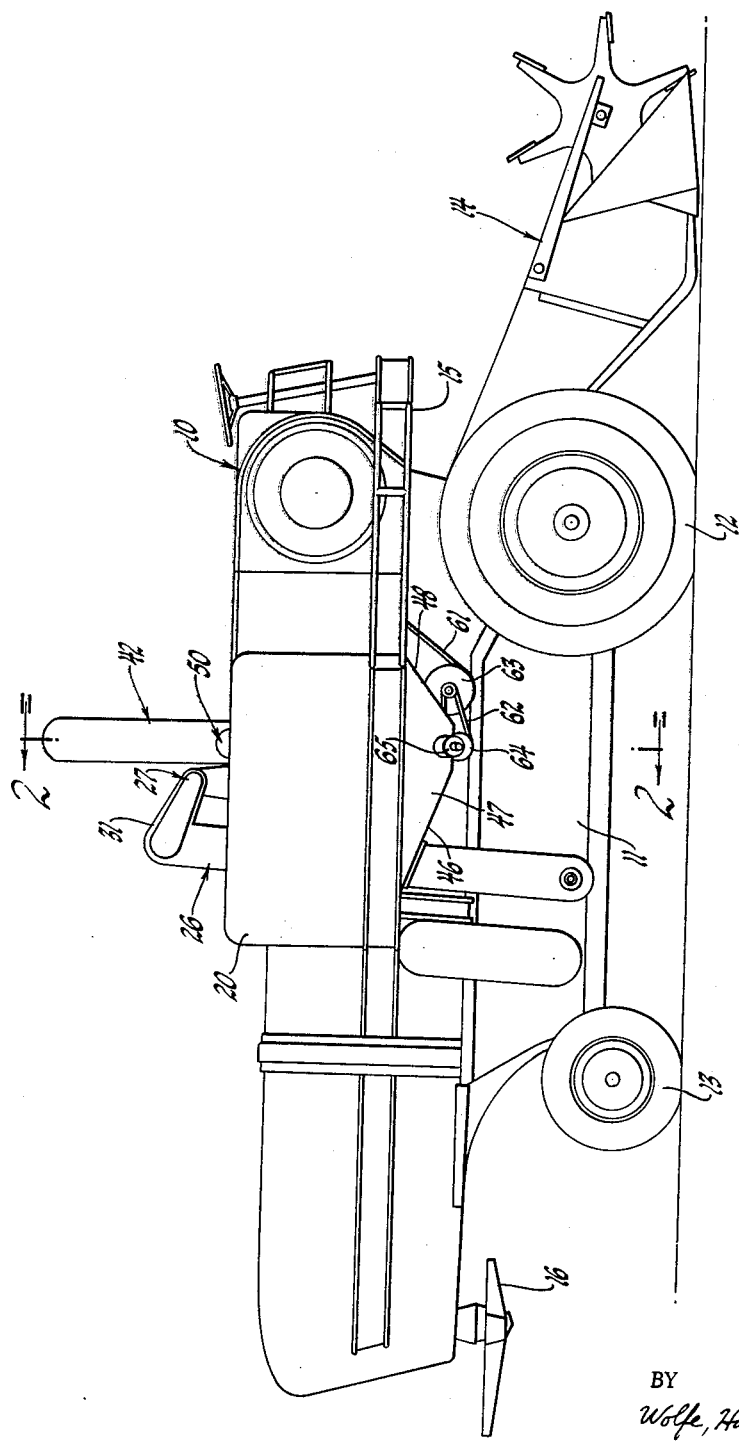
FIGURE 1 is a side elevation of a self-propelled combine embodying the present invention.

Turning first to FIGURE 1, there is shown a self-propelled combine 10 embodying the invention which includes a main body portion 11 supported by front driving wheels 12 and rear steering wheels 13. A grain header assembly 14 is supported at the forward end of the combine, and an operator's platform 15 is disposed at the front of the combine so as to overlook the header assembly. The combine body 11 encloses grain threshing and separating mechanisms, and a straw scatterer 16 is journalled at the rear of the combine.

In order to receive and temporarily store the harvested grain, the combine 10 is provided with a pair of side or saddle tanks 20 and 21 extending down along the opposite sides of the combine body 11 and which are interconnected by a center tank portion 22 lying above an upwardly sloping, or gabled, top 23 of the combine body. A crop conveyor 24 collects the grain from the separating mechanism of the combine and carries it to a loading elevator 26 that lifts the grain to a filling conveyor 27 which selectively distributes the grain between the side tanks 20, 21 so that the relative loading of each tank can be varied or kept equal.

The loading elevator 26 includes a vertical housing structure 28 enclosing a continuous chain 29 on which a plurality of pusher flights 30 are mounted for elevating the grain. The elevated grain is discharged by the flights 30 into a hood 31 which interconnects the elevator 26 and the filling conveyor 27. The filling conveyor 27 includes an auger 32 journalled in a channel defined by a tube 33 having a discharge opening 34 above the side tank 21.

To selectively fill the side tanks 20, 21, a discharge door 35 is located in the lower portion of the hood 31. The door 35 is pivotally mounted on a pin 35a on the underside of the hood 31 and is positioned above the side tank 20.

Figure 2:
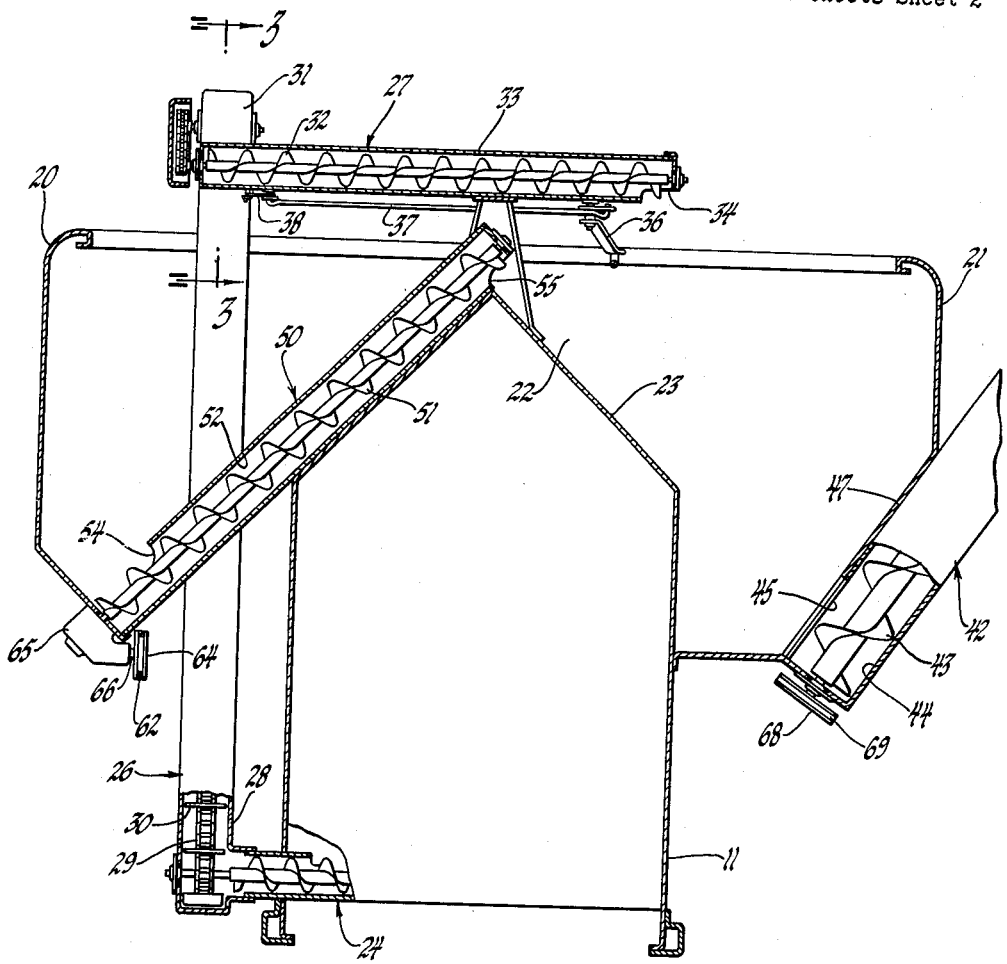
FIG. 2 is an enlarged transverse sectional view taken along the line 2—2 of FIG. 1 through the storage tanks and cleaning and separating unit of the combine.

To adjust the position of the door 35, a bell crank 36 is pivoted to the underside of the tube 33 (see FIG. 2) and a control rod 37 couples one arm of the bell crank 36 to a second bell crank 38. The second bell crank 38 is linked by a rod 39 to a lever 40 secured to the door 35. The other arm of the bell crank 36 extends forwardly of the combine so that the operator, sitting on the platform 15, can reach behind him and rotate the bell crank 36 to position the door 35 as desired.

Figure 3:
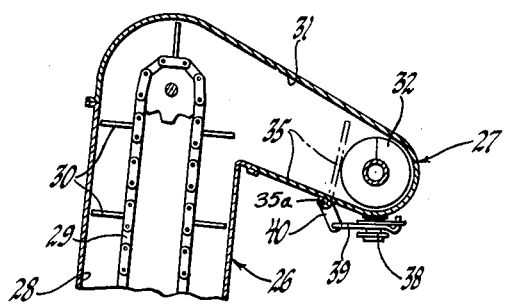
FIG. 3 is an enlarged sectional view taken substantially along the line 3—3 in FIG. 2.

When the door 35 is completely closed, as shown in the solid line position in FIG. 3, all of the grain lifted by the elevator 26 will be deposited into the filling conveyor 27 and through the opening 34 into the side tank 21. However, when the door 35 is opened, as shown in the dotted line position in FIG. 3, the grain will be deposited into the side tank 20. Accordingly, by positioning the door 35 the combine operator can selectively deposit grain in either of the side tanks.

By alternatively depositing equal amounts of grain in each of the two tanks 20, 21 the combine can be kept in lateral balance as the amount of grain temporarily stored in each of the tanks increases. Alternatively, one or the other of the two side tanks 20, 21 can be deliberately loaded a greater extent than the other tank so that the combine is placed in lateral unbalance. This is often desirable to provide stability for the combine when it is working on sharply sloping ground. Through the bell crank 36, the operator of the combine can selectively control the loading of the individual side tanks.

In order to unload the combine, a discharge conveyor 42 is coupled to the side tank 21. The discharge conveyor 42 includes an auger 43 journalled in a tube 44 that extends upwardly and outwardly from the combine body 11. The discharge conveyor 42 includes an opening 45 through which grain is received from the bottom of the side tank 21. To facilitate downward movement of grain from the side tank 21 into the opening 45, the side tank includes downwardly sloping bottom walls 46, 47 and 48 (see FIG. 1).

To unload the grain from the side tank 20, a sloping transfer conveyor 50 is provided which temporarily moves the grain into the side tank 21. The transfer conveyor 50 includes an auger 51 journalled in a tubular passage 52 disposed along one side of the gabled roof portion 23 of the combine cleaning and separating unit. An opening 54 in the conveyor 50 receives grain from the side tank 20 and an opening 55 at the upper end of the conveyor discharges the grain down the other sloping side of the cleaning and separating unit into the side tank 21. It will be apparent that by angling the transfer conveyor 50 along the gabled top 23 of the cleaning and separating unit it is not necessary to create any openings in the wall of the cleaning and separating unit to transfer grain from one side tank 20 to the other side tank 21.

For driving the transfer conveyor 50, drive belts 61 and 62 couple the combine engine through a speed-reducing pulley 63 to a drive pulley 64 mounted on a gear case 65. The gear case 65 encloses a shaft 66 and bevel gears (not shown) which are drivingly coupled to the auger 51.

The discharge conveyor 42 is driven by a pulley 68 coupled to the auger 43 and driven by a belt 69 suitably connected to a drive pulley on the combine engine.

To facilitate the rapid unloading of the side tanks 20, 21, the discharge conveyor 42 has a larger capacity than the transfer conveyor 50. To this end, it will be noted that the discharge auger 43 is larger in diameter than the transfer auger 51. Moreover, the discharge auger 43 is rotated at a speed which is effective to remove all of the grain from the side tank 21 contemporaneously with the transferal of the grain in side tank 20 by the transfer auger 51. Thus, there is no danger that the grain transferred from side tank 20 into the other side tank 21 will overflow, and in this way the two side tanks can be exhausted essentially simultaneously.

The embodiments of the invention in which an exclusive property or privilege is claimed are defined as follows:

An agricultural harvesting machine including a body portion enclosing grain cleaning and separating mechanisms with a pair of side tanks extending down along opposite sides of the machine body for temporarily storing harvested grain received from the cleaning and separating mechanisms, characterized by, a grain elevator adjacent one of said side tanks for lifting the harvested grain from the cleaning and separating mechanisms, a filling conveyor for receiving grain from said grain elevator and depositing the grain into said other side tank, a hood interconnecting said grain elevator and said filling conveyor, and a movable door pivotally mounted in the lower portion of said hood on a pin secured to the underside of the hood and positioned above said one side tank, said door being selectively positionable between an open position whereby grain is deposited by said grain elevator into said one side tank and an alternate closed position whereby grain from said grain elevator is transferred through said hood into said filling conveyor and is deposited into said other side tank.

References Cited in the file of this patent

UNITED STATES PATENTS

| | | |
|---|---|---|
| 2,182,139 | Speno | Dec. 5, 1939 |
| 2,614,707 | Bilterman | Oct. 21, 1952 |
| 2,614,708 | Hofstetter | Oct. 21, 1952 |
| 2,633,255 | Hofstetter | Mar. 31, 1953 |
| 2,642,980 | Soucek | June 23, 1953 |
| 2,813,704 | MacKissic | Nov. 19, 1957 |
| 2,925,184 | Powischill et al. | Feb. 16, 1960 |

FOREIGN PATENTS

| | | |
|---|---|---|
| 1,225,483 | France | Feb. 15, 1960 |